(12) United States Patent
Ozeki et al.

(10) Patent No.: US 7,134,982 B2
(45) Date of Patent: Nov. 14, 2006

(54) CONTROL SYSTEM FOR HYBRID DRIVE UNIT

(75) Inventors: Tatsuya Ozeki, Torrance, CA (US); Hiroatsu Endo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 105 days.

(21) Appl. No.: 10/853,555

(22) Filed: May 26, 2004

(65) Prior Publication Data

US 2004/0254046 A1    Dec. 16, 2004

(30) Foreign Application Priority Data

Jun. 16, 2003    (JP)    ............................... 2003-171253

(51) Int. Cl.
*B60K 1/02*    (2006.01)

(52) U.S. Cl. ........................................................ 477/3

(58) Field of Classification Search .................. 477/3; 903/910, 942
See application file for complete search history.

(56) References Cited

U.S. PATENT DOCUMENTS

| | | | |
|---|---|---|---|
| 3,623,568 A | 11/1971 | Mori | |
| 5,887,670 A | 3/1999 | Tabata et al. | |
| 5,951,614 A | 9/1999 | Tabata et al. | |
| 6,524,216 B1 * | 2/2003 | Suzuki et al. | 477/3 |
| 6,625,525 B1 * | 9/2003 | Yoshino et al. | 701/22 |
| 6,685,591 B1 | 2/2004 | Hanyu et al. | |
| 2002/0055411 A1 | 5/2002 | Yoshiaki et al. | |
| 2003/0064854 A1 | 4/2003 | Kotani | |
| 2004/0084233 A1 | 5/2004 | Wakuta et al. | |
| 2004/0192494 A1 | 9/2004 | Ozeki et al. | |
| 2004/0254046 A1 | 12/2004 | Ozeki et al. | |

FOREIGN PATENT DOCUMENTS

| | | |
|---|---|---|
| DE | 198 49 156 A1 | 9/1999 |
| DE | 100 08 344 A1 | 8/2000 |
| DE | 101 22 713 A1 | 2/2002 |
| DE | 100 58 020 A1 | 5/2002 |
| DE | 101 53 476 | 5/2002 |
| EP | 1 236 603 A2 | 9/2002 |
| JP | 47-31773 | 8/1972 |
| JP | 4-331602 | 12/1997 |
| JP | 09-331602 | 12/1997 |
| JP | 10-004606 | 1/1998 |
| JP | 10-23607 | 1/1998 |
| JP | 09-308008 | 11/1999 |
| JP | 2000-220731 | 8/2000 |
| JP | 2000-308206 | 11/2000 |
| JP | 2001-112113 | 4/2001 |

(Continued)

OTHER PUBLICATIONS

U.S. Appl. No. 11/166,644, filed Jun. 27, 2005, Endo et al.

*Primary Examiner*—Dirk Wright
(74) *Attorney, Agent, or Firm*—Oblon, Spivak, McClelland, Maier & Neustadt, P.C.

(57) ABSTRACT

A control system for a hybrid drive unit wherein an assist prime mover is connected through a transmission mechanism to an output member to which a torque outputted by a main prime mover is transmitted, a torque of said assist prime mover is limited within a preset range. Specifically, said torque is limited to an upper limit side in case the speed of said assist prime mover exceeds the preset value, and a lower limit value of the torque of the assist prime mover is set in case the output torque of said assist prime mover acts as a driving torque.

17 Claims, 5 Drawing Sheets

FOREIGN PATENT DOCUMENTS

| | | |
|---|---|---|
| JP | 2001-315552 | 11/2001 |
| JP | 2002-142303 | 5/2002 |
| JP | 2002-225578 | 8/2002 |
| JP | 2002-262409 | 9/2002 |
| JP | 2002-266404 | 9/2002 |
| JP | 2003-11699 | 1/2003 |
| WO | WO 98/31559 | 7/1998 |

\* cited by examiner

CONTROL SYSTEM FOR HYBRID DRIVE UNIT

BACKGROUND OF THE INVENTION

1. Field of the Invention

This invention relates to a hybrid drive unit provided with a plurality of prime movers as a power source for driving a vehicle, and more particularly, to a control system for a hybrid drive unit, wherein an assist prime mover is connected through a transmission to an output member, to which a torque is transmitted from a main prime mover.

The present invention relates to the subject matter contained in Japanese Patent Application No.2003-171253, filed on Jun. 16, 2003, which is expressly incorporated herein by reference.

2. Description of Related Art

In a vehicular hybrid drive unit, an internal combustion engine such as a gasoline engine or a Diesel engine and an electric device such as a motor generator are generally used as prime movers. The modes of combination of those internal combustion engine and electric device are various, and the number of electric devices to be used is not limited to one but may be plural. In JP-A-2002-225578, for example, there is described the hybrid drive unit, in which an engine and a first motor generator are connected to each other through a synthesizing/distributing mechanism composed of a single pinion type planetary gear mechanism so that a torque is transmitted from the synthesizing/distributing mechanism to an output member, and in which a second motor generator is connected to the output member through a gear shift mechanism so that the output torque of the second motor generator is added as the so-called "assist torque" to the output member. Moreover, the gear shift mechanism is constructed of a planetary gear mechanism capable of being interchanged between a directly connected state and a decelerating state. In the directly connected state, the torque of the second motor generator is applied as it is to the output member. In the decelerating state, on the other hand, the torque of the second motor generator is raised and applied to the output member.

In the aforementioned hybrid drive unit, the second motor generator is controlled into a power mode or a regenerative mode so that a positive torque or a negative torque can be applied to the output member. Moreover, a deceleration state can be set by the transmission so that the second motor generator can be changed into a low torque type or a small size type.

In Japanese Published Examined Application 47-31773, moreover, there is disclosed a hybrid drive unit having a high brake and a low brake for interchanging between a high gear stage and a low gear stage. In case of switching to the high gear stage, the low brake is released and the high brake is applied. In case of switching to the low gear stage, on the other hand, the high brake is released and the low brake is applied. Thus, the interchange between the high gear stage and the low gear stage can be achieved by switching a connection of the brakes.

A gear shift in the transmission having such a construction as described in the aforementioned JP-A-2002-225578 is achieved by a control to change a ratio of speed between a member of an input side such as the motor generator and a member of an output side such as the output shaft. Consequently, the speeds of the transmission and the rotary member connected thereto are changed before and after the gear shift. An abrupt change in the speed makes an inertia torque accompanying the change in the speed larger so that so-called "shift shocks" is deteriorated. For this reason, in an ordinary automatic transmission for a vehicle according to the prior art, a torque capacity, i.e., an apply pressure of a frictional engagement device to participate in the shifting operation such as a clutch is controlled to change an output shaft torque smoothly.

However, if a timing of applying/releasing the clutch or the brake to participate in the shifting operation is off, a load added to the second motor generator fluctuates abruptly and thereby the speed of the second motor generator becomes too high or too low. Therefore, it takes time to raise the speed to a synchronous speed or lower, and energy to be absorbed in conjunction with the adjustment to the synchronous speed has to be increased. This may cause a delay in the gear shift and deterioration of durability of the frictional engagement device. Moreover, shocks accompanying the change in the speed may occur if the frictional engagement device is applied/released abruptly so as to avoid the delay in the gear shift.

SUMMARY OF THE INVENTION

The present invention has been conceived noting the technical problems thus far described and its object is to provide a control system which can certainly progress a shifting operation in a transmission mechanism in which an electric motor having a power mode function and a regenerative function is connected to an output member.

In order to achieve the above-specified objects, this invention is constructed to limit a change in a torque or a speed of an assist prime mover at a shifting time.

Accordingly, an output of a torque the assist prime mover is limited at a shifting time of the transmission mechanism. As a result, the speed of a predetermined rotary member is suppressed within a preset range to avoid the delay in the gear shift, so that shocks caused by the gear shift is limited and the gear shift can be achieved without giving a driver an uncomfortable feeling. Also, an unreasonable force is not applied to the transmission so that a lifetime of the transmission can be elongated.

Moreover, in case the speed of the assist prime mover exceeds a preset value while carrying out the gear shift when the torque is being outputted from the assist prime mover, a further increase in the torque is suppressed. In addition, no further unreasonable force is applied to the transmission. Therefore, the shocks caused by the gear shift can be reduced, and the gear shift can be achieved without giving a driver the uncomfortable feeling. Also, no further unreasonable force is applied to the transmission, so that durability of the transmission can be improved.

Furthermore, in case of carrying out the gear shift when the torque is not being outputted from the assist prime mover, further reduction of the torque can be suppressed. Therefore, it is possible to shorten the time to raise the speed again so that the delay in the shifting operation can be prevented.

The above and further objects and novel features of this invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENT

Figure 3:
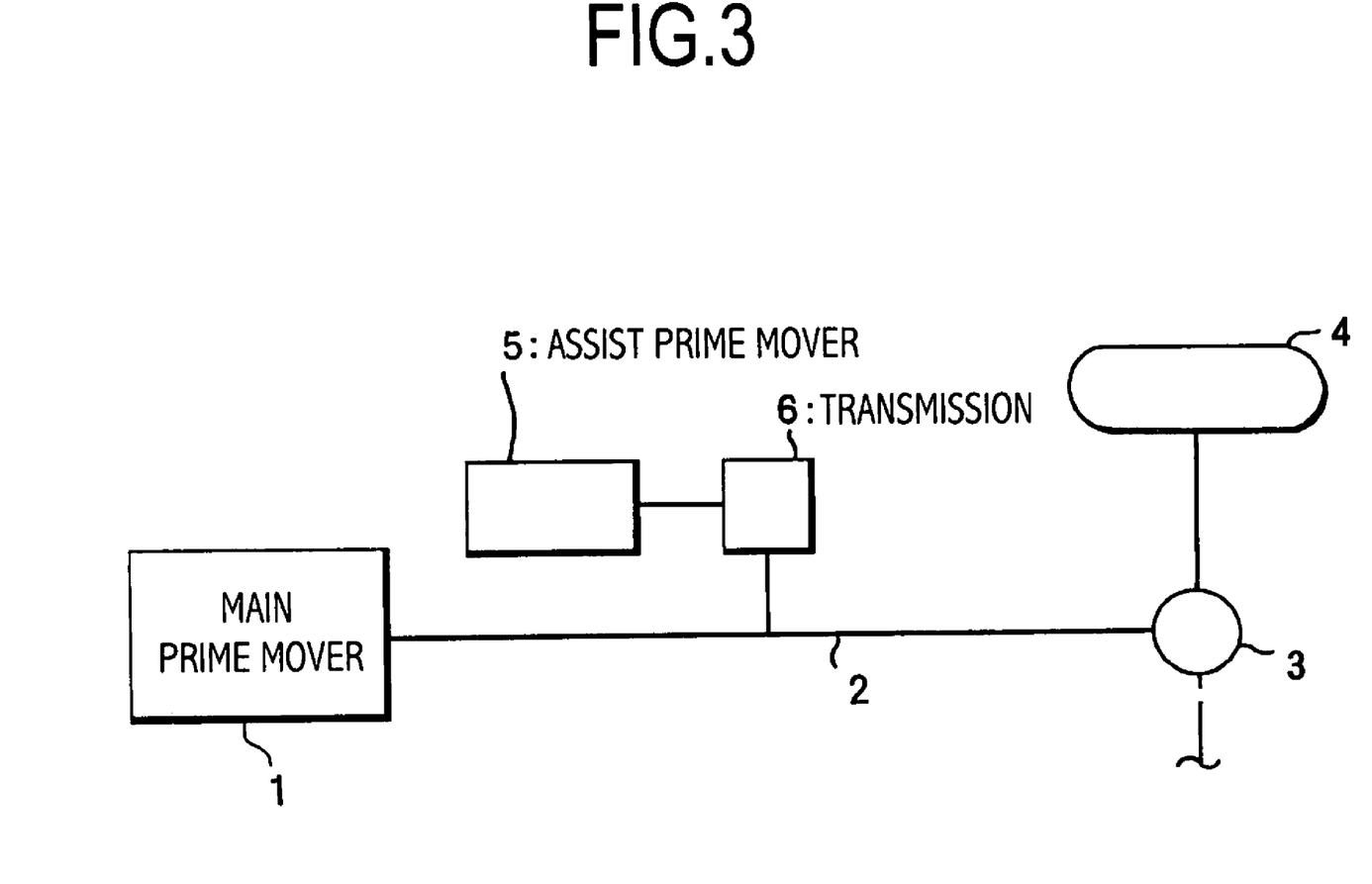
FIG. 3 is a block diagram showing an example of a hybrid drive unit to which this invention is applied.

This invention will be described in connection with its specific examples. The first description is made on a hybrid drive unit, to which this invention is applied. The hybrid drive unit or an application target of this invention is mounted on a vehicle, for example. As shown in FIG. 3, the torque of a main prime mover 1 is transmitted to an output member 2, from which the torque is transmitted through a differential 3 to drive wheels 4. On the other hand, there is provided an assist prime mover 5, which can make a power control to output a driving force for a drive and a regenerative control to recover an energy. This assist prime mover 5 is connected through a transmission 6 to the output member 2. Between the assist prime mover 5 and the output member 2, therefore, the transmission torque is increased/decreased according to a gear ratio to be set by the transmission 6.

This transmission 6 can be constructed to set the gear ratio at "1" or higher. With this construction, at the power running time for the assist prime mover 5 to output the torque, this torque can be raised and transmitted to the output member 2 so that the assist prime mover 5 can be made to have a low capacity or a small size. However, it is preferred that the running efficiency of the assist prime mover 5 is kept in a satisfactory state. In case the speed of the output member 2 rises according to the vehicle speed, for example, the gear ratio is lowered to decrease the speed of the assist prime mover 5. In case the speed of the output member 2 drops, on the other hand, the gear ratio may be raised.

Figure 4:
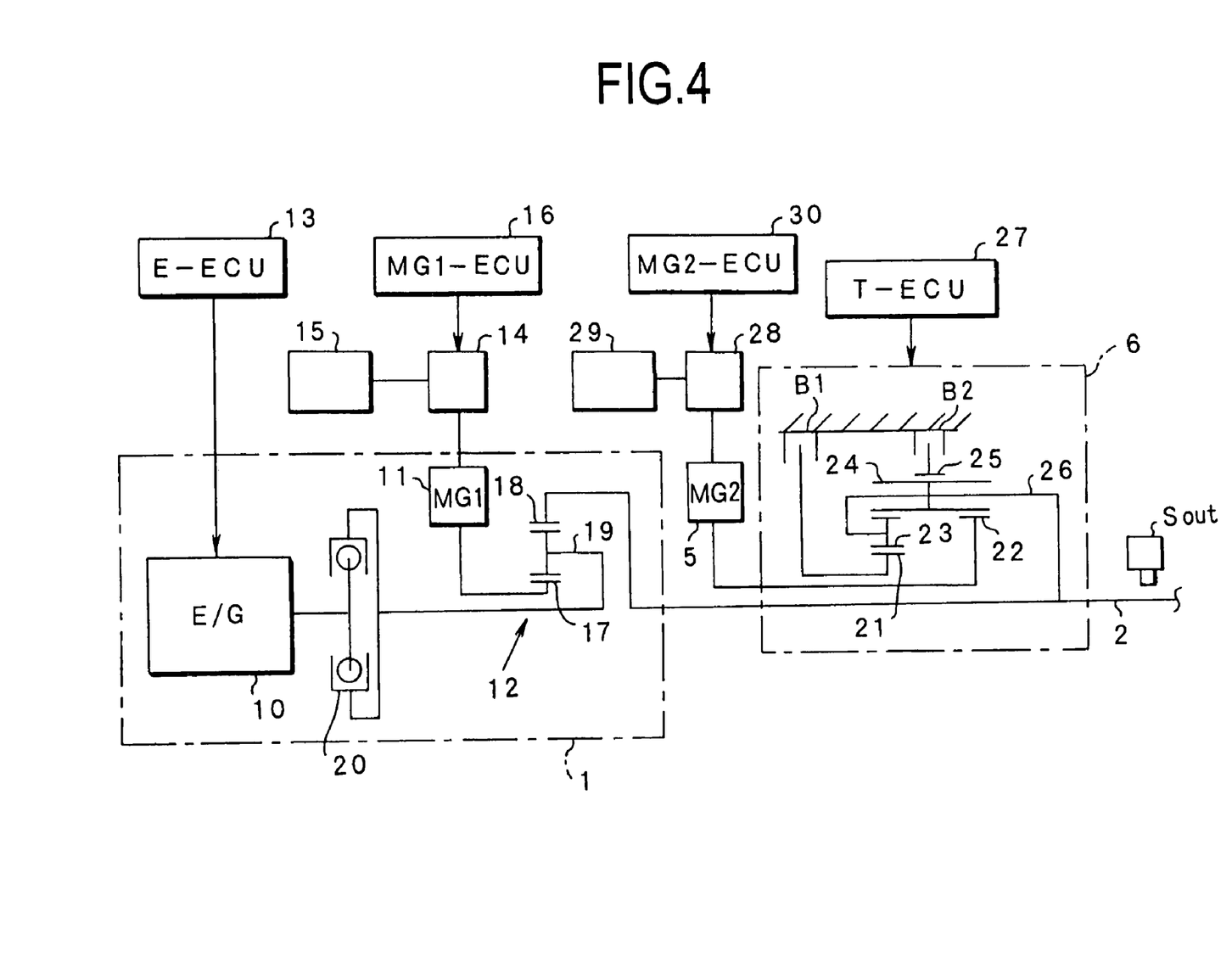
FIG. 4 is a skeleton diagram showing the hybrid drive unit more specifically.

As shown in FIG. 4, more specifically, the main prime mover 1 is mainly constructed to include an internal combustion engine 10, a motor generator (as will be tentatively called the "first motor generator" or "MG 1") 11, and a planetary gear mechanism 12 for synthesizing or distributing the torque between those internal combustion engine 10 and first motor generator 11. The internal combustion engine (as will be called the "engine" hereinafter) 10 is a well-known power unit such as a gasoline engine or a diesel engine for outputting a power by burning a fuel, and is so constructed that its running state such as a throttle opening (or the air intake amount), the fuel feed amount or the ignition timing can be electrically controlled. This control is made by an electronic control unit (E-ECU) 13 composed mainly of a microcomputer, for example.

On the other hand, the first motor generator 11 is exemplified by a synchronous electric motor and is constructed to function as an electric motor and a dynamo. The first motor generator 11 is connected through an inverter 14 with an accumulator device 15 such as a battery. By controlling the inverter 14, moreover, the output torque or the regenerative torque of the first motor generator 11 is suitably set. For this control, there is provided an electronic control unit (MG1-ECU) 16, which is composed mainly of a microcomputer. Here, a stator (not shown) of the first motor generator 11 is so fixed that it cannot rotate.

Moreover, the planetary gear mechanism 12 is a well-known one for establishing a differential action with three rotary elements: a sun gear 17 or an external gear; a ring gear 18 or an internal gear arranged concentrically with the sun gear 17; and a carrier 19 holding a pinion gear meshing with those sun gear 17 and ring gear 18 such that the pinion gear may rotate on its axis and revolve around the carrier 19. The internal combustion engine 10 has its output shaft connected through a damper 20 to that carrier 19. In other words, the carrier 19 acts as an input element.

On the other hand, a rotor (not shown) of the first motor generator 11 is connected to the sun gear 17. Therefore, this sun gear 17 is the so-called "reaction element", and the ring gear 18 is the output element. And, this ring gear 18 is connected to the output member (i.e., the output shaft) 2.

In the example shown in FIG. 4, on the other hand, the transmission 6 is constructed of one set of Ravignaux type planetary gear mechanisms. These planetary gear mechanisms are individually provided with external gears, i.e., a first sun gear 21 and a second sun gear 22, of which the first sun gear 21 meshes with a short pinion 23, which meshes with an axially longer long pinion 24, which meshes with a ring gear 25 arranged concentrically with the individual sun gears 21 and 22. Here, the individual pinions 23 and 24 are so held by a carrier 26 as to rotate on their axes and to revolve around the carrier 26. Moreover, the second sun gear 22 meshes with the long pinion 24. Thus, the first sun gear 21 and the ring gear 25 construct a mechanism corresponding to a double-pinion type planetary gear mechanism together with the individual pinions 23 and 24, and the second sun gear 22 and the ring gear 25 construct a mechanism corresponding to a single pinion type planetary gear mechanism together with the long pinion 24.

There are also provided a first brake B1 for fixing the first sun gear 21 selectively, and a second brake B2 for fixing the ring gear 25 selectively. These brakes B1 and B2 are the so-called "frictional engagement devices" for establishing applying forces by frictional forces, and can adopt a multi-disc engagement device or a band type engagement device. The brakes B1 and B2 are constructed to change their torque capacities continuously according to the engaging forces of oil pressures or electromagnetic forces. Moreover, the aforementioned assist prime mover 5 is connected to the second sun gear 22, and the carrier 26 is connected to the output shaft 2.

In the transmission 6 thus far described, therefore, the second sun gear 22 is the so-called "input element", and the carrier 26 is the output element. The transmission 6 is constructed to set high gear stages of gear ratios higher than "1" by applying the first brake B1, and to set low gear stages of gear ratios higher than those of the high gear stages by applying the second brake B2 in place of the first brake B1. The shifting operations between those individual gear stages are executed on the basis of a running state such as a vehicle speed or a drive demand (or the accelerator opening). More specifically, the shifting operations are controlled by predetermining gear stage regions as a map (or a shifting diagram) and by setting any of the gear stages according to the detected running state. For these controls, there is provided an electronic control unit (T-ECU) 27, which is composed mainly of a microcomputer.

Here, in the example shown in FIG. 4, there is adopted as the assist prime mover 5 a motor generator (as will be tentatively called the "second motor generator" or "MG2"), which can have the power mode to output the torque and the regenerative mode to recover the energy. Specifically, a rotor (not shown) of the second motor generator 5 is connected to the second sun gear 22. Moreover, the second motor generator 5 is connected through an inverter 28 to the battery 29. The power mode, the regenerative mode and the torques in the individual modes are controlled by controlling the inverter 28 by an electronic control unit (MG2-ECU) 30 composed mainly of a microcomputer. Here, the battery 29 and the electronic control unit 30 can also be integrated with the inverter 14 and the battery (the accumulator device) 15 for the aforementioned first motor generator 11. Here, a stator (not shown) of the second motor generator 5 is so fixed that it cannot rotate.

Figure 5:
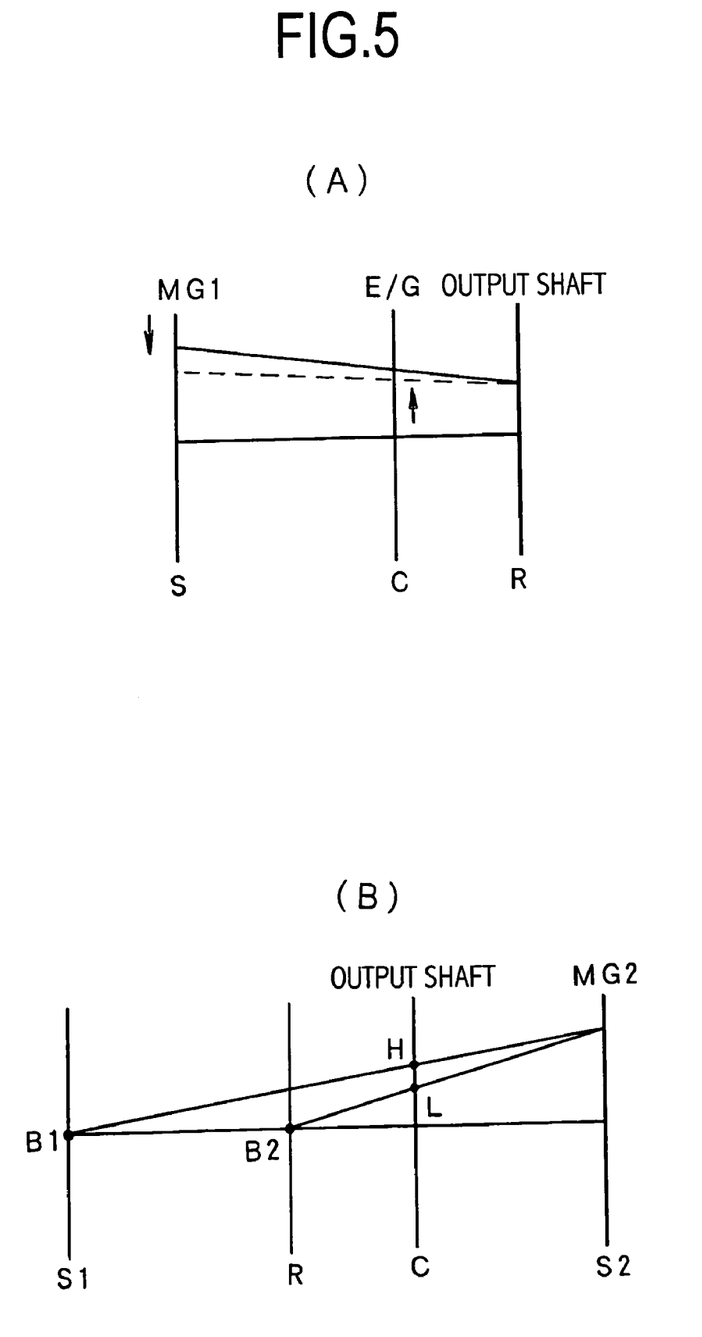
FIG. 5 is a nomographic diagram showing individual planetary gear mechanisms shown in FIG. 4.

A nomographic diagram of the single pinion type planetary gear mechanism 12 as the aforementioned torque synthesizing/distributing mechanism is present at (A) in FIG. 5. When a reaction torque by the first motor generator 11 is inputted to the sun gear 17 against the torque to be inputted to the carrier 19 and outputted by the engine 10, a higher torque than that inputted from the engine 10 appears at the ring gear 18 acting as the output element. In this case, the rotor of the first motor generator 11 is rotated by the torque and the first motor generator 11 functions as a dynamo. With the speed (or the output speed) of the ring gear 18 being constant, on the other hand, the speed of the engine 10 can be continuously (or without any step) changed by increasing/decreasing the speed of the first motor generator 11. Specifically, the control for setting the speed of the engine 10 at a value for the best fuel economy can be made by controlling the first motor generator 11. Here, the hybrid type of this kind is called the "mechanical distribution type" or "split type".

On the other hand, a nomographic diagram of the Ravignaux type planetary gear mechanism constructing the transmission 6 is presented at (B) in FIG. 5. When the ring gear 25 is fixed by the second brake B2, a low gear stage L is set so that the torque outputted from the second motor generator 5 is amplified according to the gear ratio and applied to the output shaft 2. When the first sun gear 21 is fixed by the first brake B1, on the other hand, there is set a high gear stage H having a lower gear ratio than that of the low gear stage L. The gear ratio at this high gear stage H is lower than "1" so that the torque outputted by the second motor generator 5 is augmented according to that gear ratio and applied to the output shaft 2.

Here, in the state where the individual gear stages L and H are steadily set, the torque to be applied to the output shaft 2 is such one as is augmented from the output torque of the second motor generator 5 according to the gear ratio. In the shifting transitional state, however, the torque is such one as is influenced by the torque capacities at the individual brakes B1 and B2 and by the inertia torque accompanying the speed change. On the other hand, the torque to be applied to the output shaft 2 is positive in the drive state of the second motor generator 5 but negative in the driven state.

The hybrid drive unit thus far described is intended mainly to reduce the exhaust gas emission and to improve the fuel consumption by driving the engine 10 in a state as efficient as possible, and also to improve the fuel consumption, by performing the energy regeneration. In case a high driving force is demanded, therefore, with the torque of the main prime mover 1 being transmitted to the output shaft 2, the second motor generator 5 is driven to add its torque to the output shaft 2. In this case, in a low vehicle speed state, the transmission 6 is set at the low gear stage L to increase the torque to be added. In case the vehicle speed then rises, the transmission 6 is set at the high gear stage H to lower the speed of the second motor generator 5. This is because the driving efficiency of the second motor generator 5 is kept in a satisfactory state to prevent the fuel consumption from being deteriorated.

In the aforementioned hybrid drive unit, therefore, the shifting operation may be executed by the transmission 6 while the vehicle is running with the second motor generator 5 being active. This shifting operation is executed by switching the applications/releases of the aforementioned individual brakes B1 and B2. In case the low gear stage L is switched to the high gear stage H, for example, simultaneously as the second brake B2 is released from its applied state, the first brake B1 is applied to execute the shifting from the low gear stage L to the high gear stage H.

In case of carrying out such a shifting operation, the load applied to the second motor generator 5 may fluctuate prominently depending on the timing of the application/release between the first brake B1 and the second brake B2. In this case, the speed of the second motor generator 5 fluctuates prominently due to the fluctuation of the load applied to the second motor generator 5. In order to prevent such fluctuation in the load applied to the second motor generator 5, the following controls is carried out.

Figure 1:
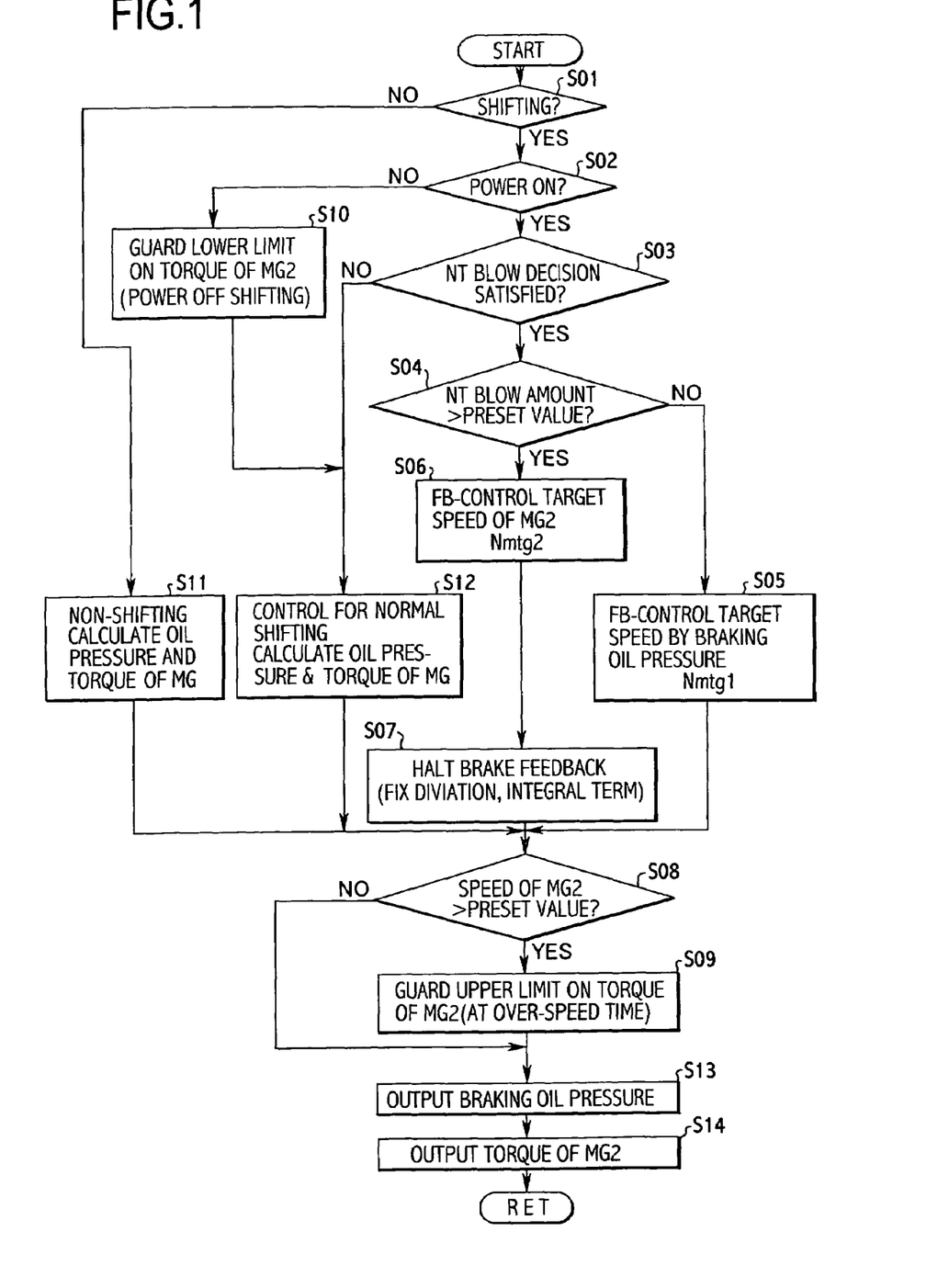
FIG. 1 is an overall flowchart showing one example of a control by a control system of this invention.

FIG. 1 is a flowchart showing one example of the control. In FIG. 1, first of all, it is decided (at Step S01) whether or not a current status is in the shifting operation. Specifically, a change in the physical amount reflecting the running state such as the throttle opening, the vehicle speed and so on is detected and decided. In case the answer of Step S01 is NO, specifically, in case the shifting operation is not being carried out, oil pressures of the first brake B1 and the second brake B2, and the torque of the second motor generator 5 of the case in which the shifting operation is not carried out are calculated (at Step S11). Then, it is decided (at Step S08) whether or not the speed of the second motor generator 5 is higher than the preset value.

In case the answer of Step S08 is YES, specifically, in case the speed is rising excessively, an upper limit of the torque of the second motor generator 5 is guarded (at Step S09). Subsequently to this, a command signal for setting the oil pressures of the first brake B1 and the second brake B2 is outputted (at Step S13), and a command signal for setting the torque of the second motor generator 5 is outputted (at Step S14). In case the answer of Step S08 is NO, on the other hand, the routine skips Step S09 and advances to Step S13. At Step S13, the oil pressure command signals of the first brake B1 and the second brake B2, and the torque command signal of the second motor generator 5 are outputted.

The shifting operation has already started so that the answer of Step S01 is YES, on the other hand, it is decided (at Step S02) whether or not the current status is a power ON state. Specifically, it is decided whether or not the second motor generator 5 is outputting the torque to maintain the running state of the vehicle, or to accelerate the vehicle. In case the answer of Step S02 is NO, a lower limit guard is set on the output torque of the second motor generator 5. Namely, in case the second motor generator 5 is not outputting the torque, or in case the second motor generator 5 is outputting the torque but is not functioning to maintain the running of the vehicle, the lower limit is set on the torque outputted from the second motor generator 5.

When the shifting operation is carried out in so-called "a power OFF state", in which the second motor generator 5 is not outputting the torque substantially, the speed of the second motor generator 5 drops drastically in the shifting transient state in which the torque of the output shaft 2 side does not act on the second motor generator 5. As a result, it takes time to change the speed of the second motor generator 5 to the synchronous speed which accompanies the subsequent gear shift, and this may be a factor of delay in the shifting operation. In order to prevent this situation, the drop in the speed of the second motor generator 5 is suppressed by setting the lower limit on the output torque of the second motor generator 5 so as to prevent the delay in the shifting operation or deterioration of a shifting response.

After this, the oil pressures of the first brake B1 and the second brake B2 corresponding to the normal shifting operation are calculated, and the torque of the second motor generator 5 is calculated (at Step S12). At the aforementioned Steps S08 and S09, an excessive rise in the speed of the second motor generator 5 is suppressed, and the oil pressure command signals of the first brake B1 and the second brake B2, and the torque command signal of the second motor generator 5 are outputted at Steps S13 and S14.

Moreover, in case the answer of Step S02 is YES, specifically, in case the throttle opening is widened and the status is the power ON state in which the output torque of the second motor generator 5 is raised, it is decided (at Step S03) whether or not the second motor generator 5 is in a blowing state. The "blowing state" means that the output speed rises abruptly.

A decision of "the blowing state" can be made by comparing a preset value a with the difference between the output speed Nt of the second motor generator 5 and the synchronous speed after the shifting operation. For example, in case of comparing the preset value α with the synchronous speed which is set when shifted to a low speed side, i.e., a low gear stage synchronous speed, when downshifting, the "blowing state" is decided if an absolute value determined by subtracting the low gear stage synchronous speed from the output speed Nt is larger than the preset value α. In addition, "the blowing state" is decided if the absolute value determined by subtracting the low gear stage synchronous speed from the output speed Nt is larger than the preset value α, also in a case of upshifting, as the case of downshifting.

In case the answer of Step S03 is NO, specifically, in case "the blowing state" is not decided, the oil pressures of the first brake B1 and the second brake B2 corresponding to the normal shifting operation, and the torque of the second motor generator 5 are calculated (at Step S12). Then, the excessive rise in the speed of the second motor generator 5 is suppressed at the aforementioned Steps S08 and S09, and the oil pressure command signals of the first brake B1 and the second brake B2, and the torque command signal of the second motor generator 5 are outputted at Steps S13 and S14.

On the contrary, in case the answer of Step S03 is YES, specifically, in case "the blowing state" is decided, it is decided (at Step S04) whether or not the increasing amount of output speed Nt of the second motor generator 5 is larger than the preset value. In case the answer of Step S04 is NO, specifically, in case it is decided that the increasing amount of the output speed Nt of the second motor generator 5, i.e., the "blowing" amount is smaller than the preset value, the output speed is reduced (at Step S05) by changing the oil pressures of the first brake B1 and the second brake B2. This control is a feedback-control by a braking oil pressure by which the output speed of the second motor generator 5 is controlled to correspond to a target speed Nmtg1. The excessive rise in the speed of the second motor generator 5 is suppressed at Steps S08 and S09, and the oil pressure command signals of the first brake B1 and the second brake B2, and the torque command signal of the second motor generator 5 are outputted at Steps S13 and S14.

Moreover, in case the answer of Step S04 is YES, specifically, in case it is decided that the increasing amount of the output speed Nt of the second motor generator 5, i.e., the "blowing" amount is greater than the preset value, the control cannot respond to the change in the "blowing" amount with the speed control by changing the braking oil pressure. In this connection, an inverter 28 connected to the second motor generator 5 is controlled (at Step S06) so that the output speed of the second motor generator 5 reaches a second target speed Nmtg2. Specifically, the feedback-control of the second motor generator 5 is carried out electrically, and the speed thereof is controlled to reach the second target speed Nmtg2. In the meanwhile, the speed control by the braking oil pressure is halted (at Step S07). For example, a feedback deviation and an integral term in the speed feedback-control by the braking oil pressure is fixed.

In this case, also, the routine advances to Steps S08 and S09, and the excessive rise in the speed of the second motor generator 5 is suppressed thereat. Otherwise, the oil pressure command signals of the first brake B1 and the second brake B2, and the torque command signal of the second motor generator 5 are outputted at Steps S13 and S14.

Figure 2:
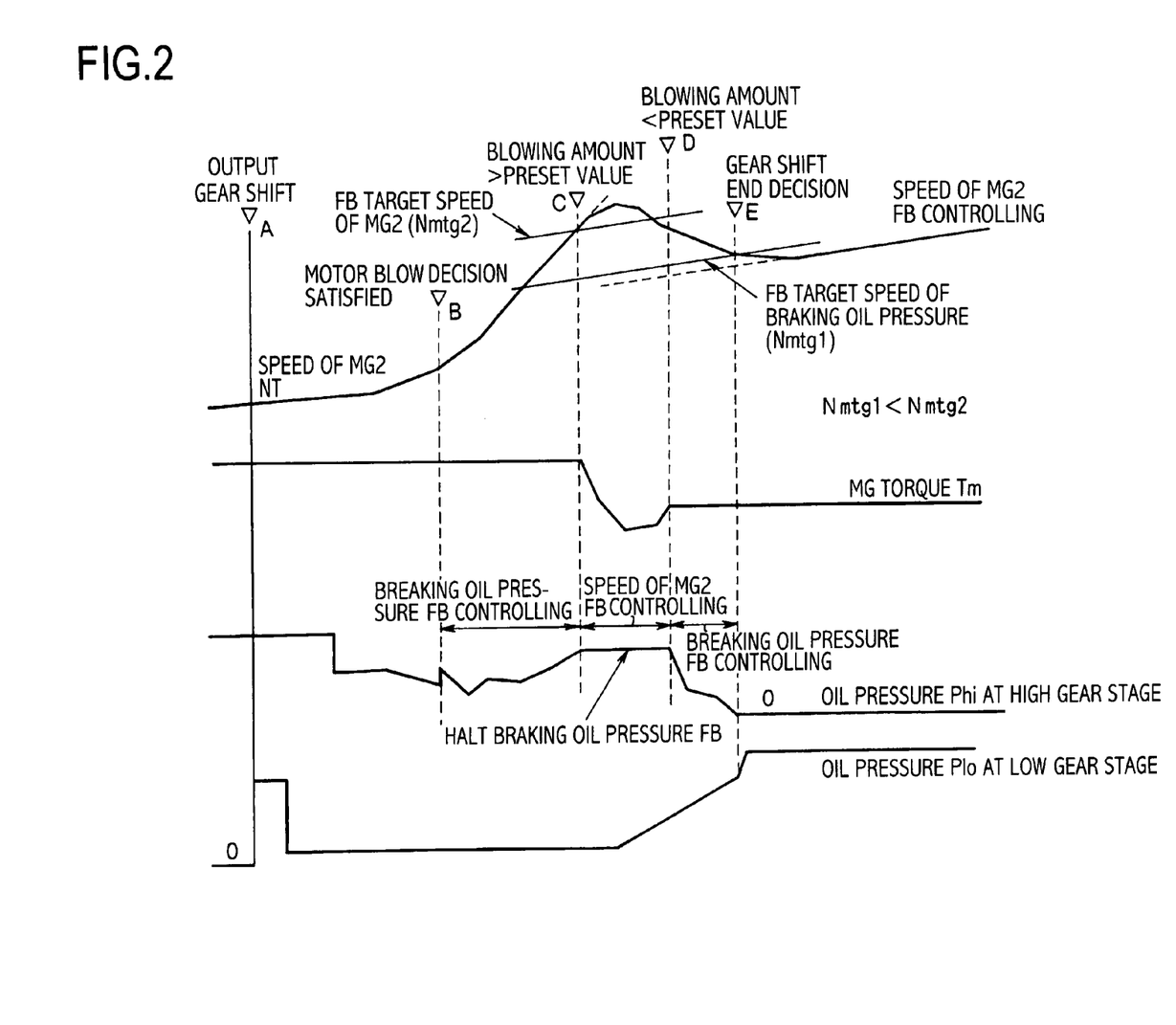
FIG. 2 is a time chart of a case in which the control shown in FIG. 1 is carried out.

FIG. 2 shows the time chart of the case in which the aforementioned control is carried out. In FIG. 2, there is shown the time chart of the case in which the downshift is executed in the power ON state. When the shifting operation is started (at a point of time A), the oil pressure command signal for a fast-fill is outputted to a hydraulic circuit of the brake, and the shifting operation is started. Then, the speed of the second motor generator 5 starts rising (from the point of time A to a point of time B).

When the speed reaches (at the point of time B) the speed at which the decision of the "blowing" of the speed of the second motor generator 5 holds, the feedback-control to orient the speed of the second motor generator 5 to the target speed Nmtg1 is executed by changing the oil pressures of the first brake B1 and the second brake B2. In this case, since the torque to raise the speed of the second motor generator 5 surpasses the torque to lower the speed of the second motor generator 5, the speed remains to rise (from the point of time B to a point of time C). This corresponds to Step S05.

In case the speed of the second motor generator 5 exceeds (at the point of time C) the preset value in the course of time, the speed of the second motor generator 5 is feedback-controlled to the second target speed Nmtg2 by controlling the inverter 28 connected to the second motor generator 5. This corresponds to Step S06. Here, the speed control by the braking oil pressure is halted in the meanwhile (from the point of time C to a point of time D). This corresponds to Step S07. Accordingly, the speed of the second motor generator 5 reaches its maximum, and then lowers to the second target speed Nmtg2.

Then, when the speed of the second motor generator 5 dips from the preset value, specifically, when the "blowing" amount dips from the preset value (at the point of time D), the speed control by the breaking oil pressure is restarted and the speed of the second motor generator 5 is controlled to reach the target speed Nmtg1 by changing the oil pressures of the first brake B1 and the second brake B2. This corresponds to Step S05. Accordingly, the speed of the second motor generator 5 further drops (from the point of time D to a point of time E) to the target speed Nmtg1.

When it is decided that the shifting operation is ended (at the point of time E) on the basis of the change in the vehicle speed or the throttle opening, a shifting control for nonshifting time is executed. Specifically, the speed of the second motor generator 5 is controlled to reach the synchronous speed which is set on the bases of the vehicle speed, the speed of the output shaft 2 or the gear ratio (after the point of time E).

The torque of the second motor generator is limited alternatively by the brake or by the electrical control according to the "blowing" amount. Since the torque is limited either way when the "blowing" occurs, the excessive change in the speed can be thereby prevented. Therefore, the shocks accompanying the gear shift can be reduced and the gear shift can be achieved without giving a driver any uncomfortable feeling. Moreover, durability of the transmission mechanism is also improved.

Here, although not especially shown in the aforementioned time chart, the speed of the second motor generator 5 is checked in every routine, and the torque is limited in case the speed is higher than the preset value. This corresponds to Steps S08 and S09. As a result of this, the maximum speed possible to be attained by the second motor generator 5 is limited, so that further "blowing" may not occur and the shocks at the shifting time can be reduced. Moreover, durability of the transmission mechanism is also improved.

Furthermore, in case the torque of the second motor generator 5 is not outputted, specifically, in case of the power OFF state, the lower limit guard is applied to the output torque of the second motor generator 5. This corresponds to Step S10. Specifically, since the shifting operation is carried out under the state where the second motor generator 5 is not outputting the torque, the speed of the second motor generator 5 drops in the shifting transient state, and takes time to reach the target speed by raising the dropped speed. In consequence of setting the lower limit guard, therefore, the speed can be prevented from too much lowering and the shifting operation can be prevented from delaying.

Here will be briefly described the relations between the aforementioned specific examples and this invention. The means for executing Step S06 shown in FIG. 1 corresponds to a torque limiting means of this invention; the means for executing Step S09 corresponds to an upper limit torque limiting means of this invention; and the means for executing Step S10 corresponds to a lower limit torque limiting means of this invention.

Here, this invention should not be limited to the aforementioned specific examples. The transmission mechanism to which this invention is applied may have a construction other than the aforementioned constructions. Accordingly, the engagement device for executing the gear shift may be a suitable frictional engagement device such as a clutch instead of the aforementioned individual brakes B1 and B2. According to this invention, moreover, the target speed of the electric motor in the shifting operation can be set in advance, or can be set sequentially on the basis of the state of the shifting operation. In addition, although the aforementioned examples have been described with respect to the case of the downshift, this invention can also be applied to the case of an upshift.

Here will be synthetically described the advantages to be attained by this invention. According to the present invention, the output of the torque from the assist prime mover is limited at the shifting time of the transmission mechanism. As a result, the speed of the predetermined rotary member is restricted within the preset range, and the delay in the shifting operation can be avoided. Therefore, the shocks caused by the gear shift is reduced, and the gear shift can be achieved without giving the driver any uncomfortable feeling. In addition, the unreasonable force is not applied to the transmission so that the lifetime of the transmission can be elongated.

Moreover, in case the speed of the assist prime mover exceeds a preset value while carrying out the shifting operation when the torque is being outputted from the assist prime mover, a further increase in the torque is suppressed. In addition, no further unreasonable force is applied to the transmission. Therefore the shocks caused by the gear shift can be reduced, and the gear shift can be achieved without giving the driver any uncomfortable feeling. Also, since the unreasonable force is not applied to the transmission, durability of the transmission can be improved.

Furthermore, in case the shifting operation is being carried out when the torque is not being outputted from the assist prime mover, further reduce in the torque can be suppressed. Therefore, the time to raise the speed again can be shortened so that the delay in the shifting operation can be prevented.

What is claimed is:

1. A control system for a hybrid drive unit, wherein an assist prime mover is connected through a transmission mechanism to an output member, to which a torque outputted by a main prime mover is transmitted, comprising:
    gear shift deciding means for deciding that said transmission mechanism is in a shifting operation; and
    torque limiting means for limiting the torque of said assist prime mover within a predetermined range during the shifting operation of said transmission mechanism.

2. A control system for a hybrid drive unit according to claim 1,
    wherein said torque limiting means include upper limit torque limiting means for limiting an upper limit of an output torque of said assist prime mover, in case a speed of said assist prime mover exceeds a preset value while the torque is being outputted relatively by said assist prime mover.

3. A control system for a hybrid drive unit according to claim 1,
    wherein said torque limiting means include lower limit torque limiting means for limiting a lower limit of the output torque of said assist prime mover, in case the torque is not being outputted relatively by said assist prime mover.

4. A control system for a hybrid drive unit according claim 1,
    wherein said assist prime mover includes an electric motor; and
    further comprising:
    deciding means for deciding whether or not the electric motor is outputting the torque during the shifting operation of said transmission mechanism, and an increasing amount of the speed of the electric motor exceeds the preset value; and
    speed control means for controlling said electric motor electrically by a feedback-control so as to make the speed of the electric motor correspond to a target speed, in case said deciding means decides that the increasing amount of the speed of the electric motor exceeds the preset value.

5. A control system for a hybrid drive unit according to claim 1, further comprising:
    hydraulic engagement means for executing the gear shift in said transmission mechanism by being released or applied by an oil pressure, and for changing a transmission torque capacity of said transmission mechanism;

deciding means for deciding whether or not said assist prime mover is outputting the torque during the shifting operation of said transmission mechanism, and the increasing amount of the speed of the assist prime mover exceeds the preset value; and hydraulic control means for controlling the oil pressure of said hydraulic engagement means by the feedback-control so as to make the speed of said assist prime mover correspond to the preset target speed, in case said deciding means decides that the increasing amount of the speed of said assist prime mover does not exceed the preset value.

6. A control system for a hybrid drive unit according to claim 1, wherein said assist prime mover includes the electric motor; and wherein said transmission mechanism comprises a hydraulic engagement mechanism for executing the gear shift in said transmission mechanism by being released or applied by the oil pressure, and for changing the transmission torque capacity of said transmission mechanism; and further comprising:

deciding means for deciding whether or not the electric motor is outputting the torque during the shifting operation in said transmission mechanism, and the increasing amount of the speed of the electric motor exceeds the preset value;

hydraulic control means for controlling the oil pressure of said hydraulic engagement mechanism by the feedback-control so as to make the speed of said electric motor correspond to the preset target speed, in case said deciding means decides that the increasing amount of the speed of said electric motor does not exceed the preset value;

speed control means for controlling said electric motor electrically by the feedback-control so as to make the speed of said electric motor correspond to a target speed, in case said deciding means decides that the increasing amount of the speed of the electric motor exceeds the preset value; and inhibiting means for inhibiting the feedback-control by said hydraulic control means, when the speed of said electric motor is feedback-controlled by said speed control means.

7. A control system for a hybrid drive unit according to claim 6, wherein the feedback-control by said hydraulic control means include a proportional action and an integral action on the basis of a deviation; and wherein said inhibiting means include means for fixing said proportional action and said integral action.

8. A control system for a hybrid drive unit, wherein an assist prime mover is connected through a transmission mechanism to an output member, to which a torque outputted by a main prime mover is transmitted, comprising:

a gear shift decider for deciding that said transmission mechanism is in the shifting operation; and a torque limiter for limiting the torque of said assist prime mover within a predetermined range during the shifting operation of said transmission mechanism.

9. A control system for a hybrid drive unit according to claim 8, wherein said torque limiter includes an upper limit torque limiter for limiting the upper limit of the output torque of said assist prime mover, in case the speed of said assist prime mover exceeds the preset value while the torque is being outputted relatively by said assist prime mover.

10. A control system for a hybrid drive unit according to claim 8, wherein said torque limiter includes a lower limit torque limiter for limiting the lower limit of the output torque of said assist prime mover, in case the torque is not being outputted relatively by said assist prime mover.

11. A control method for a hybrid drive unit, wherein an assist prime mover is connected through a transmission mechanism to an output member, to which a torque outputted by a main prime mover is transmitted, comprising:

a gear shift deciding step for deciding that said transmission mechanism is in the shifting operation; and a torque limiting step for limiting the torque of the assist prime mover within the predetermined range during the shifting operation of said transmission mechanism.

12. A control method for a hybrid drive unit according to claim 11, wherein the upper limit of the output torque of said assist prime mover is limited at said torque limiting step, in case the speed of said assist prime mover exceeds the preset value while the torque is being outputted relatively by said assist prime mover.

13. A control method for a hybrid drive unit according to claim 11, wherein the lower limit of the output torque of said assist prime mover is limited at said torque limiting step, in case the torque is not being outputted relatively by said assist prime mover.

14. A control method for a hybrid drive unit according claim 11, wherein said assist prime mover includes the electric motor; and further comprising:

a deciding step for deciding whether or not the electric motor is outputting the torque during the shifting operation of said transmission mechanism, and the increasing amount of the speed of the electric motor exceeds the preset value; and a speed control step for controlling said electric motor electrically by the feedback-control so as to make the speed of said electric motor correspond to the target speed, in case said deciding step decides that the increasing amount of the speed of the electric motor exceeds the preset value.

15. A control method for a hybrid drive unit according to claim 11, further comprising:

a deciding step for deciding whether or not the assist prime mover is outputting the torque at the shifting time of said transmission mechanism, and the increasing amount of the speed of the assist prime mover exceeds the preset value; and a hydraulic control step for controlling the oil pressure of said hydraulic engagement mechanism by the feedback-control so as to make the speed of said assist prime mover correspond to the preset target speed, in case said deciding step decides that the increasing amount of the speed of said assist prime mover does not exceed the preset value.

16. A control method for a hybrid drive unit according to claim 11, wherein said assist prime mover includes the electric motor; and wherein said transmission mechanism comprises the hydraulic engagement mechanism for executing the gear shift of said transmission mechanism by being released or applied by the oil pressure, and for changing the transmission torque capacity of said transmission mechanism; and further comprising:

a deciding step for deciding whether or not the electric motor is outputting the torque during the shifting operation of said transmission mechanism, and the increasing amount of the speed of the electric motor exceeds the preset value;

a hydraulic control step for controlling the oil pressure of said hydraulic engagement mechanism by the feedback-control so as to make the speed of said electric motor correspond to the preset target speed, in case said deciding step decides that the increasing amount of the speed of said electric motor does not exceed the preset value;

a speed control step for controlling said electric motor electrically by the feedback-control so as to make the speed of said electric motor correspond to the preset target speed, in case said deciding step decides that the increasing amount of the speed of the electric motor exceeds the preset value; and an inhibiting step for inhibiting the feedback-control of the oil pressure of said hydraulic engagement mechanism, when feedback-controlling the speed of said electric motor by said speed control step.

17. A control method for a hybrid drive unit according to claim 16, wherein the feedback-control by said hydraulic control step includes the proportional action and the integral action on the basis of a deviation; and wherein said proportional action and said integral action are fixed at said inhibiting step.

* * * * *